(12) United States Patent
Adachi et al.

(10) Patent No.: US 8,750,433 B2
(45) Date of Patent: Jun. 10, 2014

(54) DEMODULATION CIRCUIT, DEMODULATION METHOD AND RECEIVING APPARATUS

(75) Inventors: Naoto Adachi, Yokohama (JP); Masataka Umeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 13/442,443

(22) Filed: Apr. 9, 2012

(65) Prior Publication Data

US 2012/0300883 A1   Nov. 29, 2012

(30) Foreign Application Priority Data

May 27, 2011   (JP) ................................. 2011-119165

(51) Int. Cl.
*H04L 27/06* (2006.01)
(52) U.S. Cl.
USPC ........... 375/341; 375/262; 375/265; 375/316; 375/324; 375/340; 714/751; 714/752; 714/794; 714/795; 714/796

(58) Field of Classification Search
USPC ................. 375/262, 265, 316, 324, 340, 341; 714/751, 752, 794, 795, 796
See application file for complete search history.

(56) References Cited

U.S. PATENT DOCUMENTS 7,349,496 B2 *   3/2008   Jia et al. ......................... 375/341
8,428,169 B1 *   4/2013   Lee et al. ....................... 375/267

FOREIGN PATENT DOCUMENTS

JP   2008-10987   1/2008

* cited by examiner

*Primary Examiner* — Leon Flores
(74) *Attorney, Agent, or Firm* — Fujitsu Patent Center

(57) ABSTRACT

A demodulation circuit includes a hard decision process unit and a soft decision process unit. The hard decision process unit is configured to perform a hard decision process using a demodulated signal, and the demodulated signal is a demodulated received signal. The soft decision process unit is configured to determine a range of assignment with respect to a transitioning part in the demodulated signal, calculate a likelihood value of a bit, and perform a soft decision process.

9 Claims, 16 Drawing Sheets

| 1 TIMES | | DEMAPPING RESULT | | |
|---|---|---|---|---|
| | | b0,b1 | b2,b3 | b4,b5 |
| MAPPING POSITION (X) | −7～−5 | 1 | 0 | (7+X)/2 |
| | −5～−3 | 1 | (5+X)/2 | 1 |
| | −3～−1 | 1 | 1 | (−1−X)/2 |
| | −1～+1 | (1−X)/2 | 1 | 0 |
| | +1～+3 | 0 | 1 | (−1+X)/2 |
| | +3～+5 | 0 | (5−X)/2 | 1 |
| | +5～+7 | 0 | 0 | (7−X)/2 |

FIG.7A

| 1.5 TIMES | | DEMAPPING RESULT |
|---|---|---|
| | | b0, b1 |
| MAPPING POSITION (X) | −7~−5 | 1 |
| | −5~−3 | 1 |
| | −3~−1.5 | 1 |
| | −1.5~+1.5 | (1.5−X)/3 |
| | +1.5~+3 | 0 |
| | +3~+5 | 0 |
| | +5~+7 | 0 |

FIG.7B

| 1.5 TIMES | | DEMAPPING RESULT |
|---|---|---|
| | | b2, b3 |
| MAPPING POSITION (X) | −7~−5.5 | 0 |
| | −5.5~−2.5 | (5.5+X)/3 |
| | −2.5~−1 | 1 |
| | −1~+1 | 1 |
| | +1~+2.5 | 1 |
| | +2.5~+5.5 | (5.5−X)/3 |
| | +5.5~+7 | 0 |

FIG.7C

| 1.5 TIMES | | DEMAPPING RESULT |
|---|---|---|
| | | b4, b5 |
| MAPPING POSITION (X) | −7~−4.5 | (7.5+X)/3 |
| | −4.5~−3.5 | 1 |
| | −3.5~−0.5 | (−0.5−X)/3 |
| | −0.5~+0.5 | 0 |
| | +0.5~+3.5 | (−0.5+X)/3 |
| | +3.5~+4.5 | 1 |
| | +4.5~+7 | (7.5−X)/3 |

FIG.9A

| 2.0 TIMES | | DEMAPPING RESULT |
|---|---|---|
| | | b0, b1 |
| MAPPING POSITION (X) | −7～−5 | 1 |
| | −5～−3 | 1 |
| | −3～−2 | 1 |
| | −2～+2 | (2−X)/4 |
| | +2～+3 | 0 |
| | +3～+5 | 0 |
| | +5～+7 | 0 |

FIG.9B

| 2.0 TIMES | | DEMAPPING RESULT |
|---|---|---|
| | | b2, b3 |
| MAPPING POSITION (X) | −7～−6 | 0 |
| | −6～−2 | (6+X)/4 |
| | −2～−1 | 1 |
| | −1～+1 | 1 |
| | +1～+2 | 1 |
| | +2～+6 | (6−X)/4 |
| | +6～+7 | 0 |

FIG.9C

| 2.0 TIMES | | DEMAPPING RESULT |
|---|---|---|
| | | b4, b5 |
| MAPPING POSITION (X) | −7～−4 | (8+X)/4 |
| | −4～+0 | −X/4 |
| | +0～+4 | X/4 |
| | +4～+7 | (8−X)/4 |

FIG.12

|  |  | MODULATION METHOD (MO) | | |
| --- | --- | --- | --- | --- |
|  |  | QPSK | 16QAM | 64QAM |
| CODING RATE (CO) | 1/2 | 1.5 TIMES | 3.0 TIMES | 4.0 TIMES |
|  | 2/3 | 1.5 TIMES | 2.5 TIMES | 3.0 TIMES |
|  | 3/4 | 1.5 TIMES | 2.0 TIMES | 2.5 TIMES |
|  | 5/6 | 1.0 TIMES | 1.5 TIMES | 1.5 TIMES |
|  | 7/8 | 1.0 TIMES | 1.0 TIMES | 1.0 TIMES |

FIG.13

| Bit | | SUMMARY | | |
|---|---|---|---|---|
| 0 | 1 | STANDARD OF DIFFERENTIAL DEMODULATION | | |
| 1~16 | 16 | SYNCHRONIZATION SIGNAL | | |
| 17~19 | 3 | SEGMENT FORMAT IDENTIFICATION | | |
| 20~21 | 2 | SYSTEM IDENTIFICATION | | |
| 22~25 | 4 | TRANSMISSION PARAMETER SWITCH INDICATION | | |
| 26 | 1 | EMERGENCY WARNING BROADCAST ACTIVATING FLAG | | |
| 27 | 1 | CURRENT INFORMATION | | PARTIAL RECEPTION FLAG |
| ○ 28~30 | 3 | | A | MODULATION METHOD |
| △ 31~33 | 3 | | A | CONVOLUTIONAL CODING RATE |
| 34~36 | 3 | | A | INTERLEAVING LENGTH |
| 37~40 | 4 | | A | NUMBER OF SEGMENTS |
| ○ 41~43 | 3 | | B | MODULATION METHOD |
| △ 44~46 | 3 | | B | CONVOLUTIONAL CODING RATE |
| 47~49 | 3 | | B | INTERLEAVING LENGTH |
| 50~53 | 4 | | B | NUMBER OF SEGMENTS |
| ○ 54~56 | 3 | | C | MODULATION METHOD |
| △ 57~59 | 3 | | C | CONVOLUTIONAL CODING RATE |
| 60~62 | 3 | | C | INTERLEAVING LENGTH |
| 63~66 | 4 | | C | NUMBER OF SEGMENTS |
| 67 | 1 | NEXT INFORMATION | | PARTIAL RECEPTION FLAG |
| 68~70 | 3 | | A | MODULATION METHOD |
| 71~73 | 3 | | A | CONVOLUTIONAL CODING RATE |
| 74~76 | 3 | | A | INTERLEAVING LENGTH |
| 77~80 | 4 | | A | NUMBER OF SEGMENTS |
| 81~83 | 3 | | B | MODULATION METHOD |
| 84~86 | 3 | | B | CONVOLUTIONAL CODING RATE |
| 87~89 | 3 | | B | INTERLEAVING LENGTH |
| 90~93 | 4 | | B | NUMBER OF SEGMENTS |
| 94~96 | 3 | | C | MODULATION METHOD |
| 97~99 | 3 | | C | CONVOLUTIONAL CODING RATE |
| 100~102 | 3 | | C | INTERLEAVING LENGTH |
| 103~106 | 4 | | C | NUMBER OF SEGMENTS |
| 107~109 | 3 | JOINT TRANSMISSION PHASE CORRECTION AMOUNT | | |
| 110~121 | 12 | Reserve(All '1') | | |
| 122~203 | 82 | ERROR CORRECTION PARITY | | |

FIG.14

TRANSMISSION PARAMETER SWITCH INDICATION — TERRESTRIAL DIGITAL TELEVISION BROADCAST SYSTEM

| | | | |
|---|---|---|---|
| | SEGMENT FORMAT IDENTIFICATION | 000 | SYNCHRONOUS DEMODULATION |
| | | 111 | DIFFERENTIAL DEMODULATION |
| | SYSTEM IDENTIFICATION | 00 | TERRESTRIAL DIGITAL TELEVISION BROADCAST SYSTEM |
| | | 01 | TERRESTRIAL AUDIO BROADCAST SYSTEM |
| | | 1x | Reserve |
| | | 1111 | NORMAL VALUE |
| | | 1110~0000 | PARAMETER IS SWITCHED (VALUE−1) LATER |
| | EMERGENCY WARNING BROADCAST ACTIVATING FLAG | 0 | Disable |
| | | 1 | Enable |
| | PARTIAL RECEPTION FLAG | 0 | Disable |
| | | 1 | Enable |
| ○ | MODULATION METHOD | 000 | DQPSK |
| | | 001 | QPSK |
| | | 010 | 16QAM |
| | | 011 | 64QAM |
| | | 100~110 | Reserve |
| | | 111 | LAYER NOT IN USE |
| △ | CONVOLUTIONAL CODING RATE | 000 | 1/2 |
| | | 001 | 2/3 |
| | | 010 | 3/4 |
| | | 011 | 5/6 |
| | | 100 | 7/8 |
| | | 101~110 | Reserve |
| | | 111 | LAYER NOT IN USE |
| | INTERLEAVING LENGTH | 000 | 0 |
| | | 001 | 4(Mode1), 2(Mode2), 1(Mode3) |
| | | 010 | 8(Mode1), 4(Mode2), 2(Mode3) |
| | | 011 | 16(Mode1), 8(Mode2), 4(Mode3) |
| | | 100 | 32(Mode1), 16(Mode2), 8(Mode3) |
| | | 101~110 | Reserve |
| | | 111 | LAYER NOT IN USE |
| | NUMBER OF SEGMENTS | 0000 | Reserve |
| | | 0001~1101 | VALUE INDICATES NUMBER OF SEGMENTS |
| | | 1110 | Reserve |
| | | 1111 | LAYER NOT IN USE |
| | *JOINT TRANSMISSION PHASE CORRECTION AMOUNT | 000 | $-\pi/4$ |
| | | 001 | $-2\pi/4$ |
| | | 010 | $-3\pi/4$ |
| | | 011 | $-4\pi/4$ |
| | | 100 | $-5\pi/4$ |
| | | 101 | $-6\pi/4$ |
| | | 110 | $-7\pi/4$ |
| | | 111 | 0 |

MO: { DQPSK, QPSK, 16QAM, 64QAM }
CO: { 1/2, 2/3, 3/4, 5/6, 7/8 }

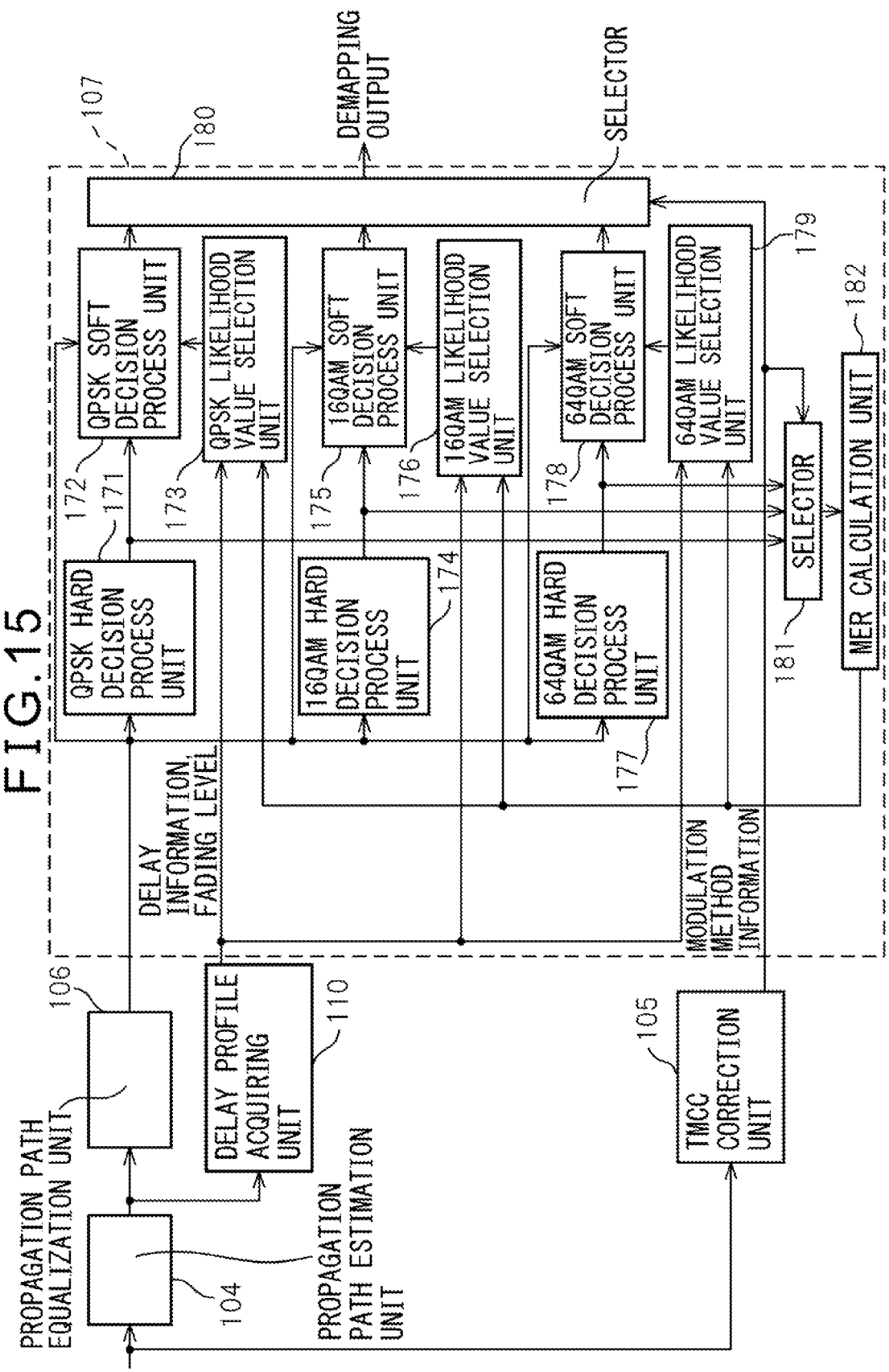

FIG.16A

| QPSK | | DELAY INFORMATION, FADING LEVEL | | |
|---|---|---|---|---|
| | | LOW | MEDIUM | HIGH |
| MER | 7 dB OR LOWER | 1.5 TIMES | 1.5 TIMES | 1.0 TIMES |
| | 7 dB OR HIGHER | 1.0 TIMES | 1.0 TIMES | 1.0 TIMES |

FIG.16B

| 16QAM | | DELAY INFORMATION, FADING LEVEL | | |
|---|---|---|---|---|
| | | LOW | MEDIUM | HIGH |
| MER | 4 dB OR LOWER | 4.0 TIMES | 3.0 TIMES | 2.0 TIMES |
| | 7 dB OR LOWER | 3.0 TIMES | 2.5 TIMES | 1.5 TIMES |
| | 10 dB OR LOWER | 2.5 TIMES | 2.0 TIMES | 1.5 TIMES |
| | 13 dB OR LOWER | 2.0 TIMES | 1.5 TIMES | 1.0 TIMES |
| | 16 dB OR LOWER | 1.5 TIMES | 1.0 TIMES | 1.0 TIMES |
| | 16 dB OR HIGHER | 1.0 TIMES | 1.0 TIMES | 1.0 TIMES |

FIG.16C

| 64QAM | | DELAY INFORMATION, FADING LEVEL | | |
|---|---|---|---|---|
| | | LOW | MEDIUM | HIGH |
| MER | 10 dB OR LOWER | 4.0 TIMES | 3.0 TIMES | 2.0 TIMES |
| | 13 dB OR LOWER | 3.0 TIMES | 2.5 TIMES | 1.5 TIMES |
| | 16 dB OR LOWER | 2.5 TIMES | 2.0 TIMES | 1.5 TIMES |
| | 19 dB OR LOWER | 2.0 TIMES | 1.5 TIMES | 1.0 TIMES |
| | 22 dB OR LOWER | 1.5 TIMES | 1.0 TIMES | 1.0 TIMES |
| | 22 dB OR HIGHER | 1.0 TIMES | 1.0 TIMES | 1.0 TIMES |

FIG.16D

| QPSK | | FADING LEVEL | | |
|---|---|---|---|---|
| | | 0Hz | 70 Hz OR LOWER | 70 Hz OR HIGHER |
| DELAY INFORMATION | 0us | LOW | MEDIUM | HIGH |
| | GUARD INTERVAL LENGTH OR LESS | MEDIUM | HIGH | HIGH |
| | GUARD INTERVAL LENGTH OR GREATER | HIGH | HIGH | HIGH |

DEMODULATION CIRCUIT, DEMODULATION METHOD AND RECEIVING APPARATUS

CROSS REFERENCE TO RELATED APPLICATION

This application is based upon and claims the benefit of priority of the prior Japanese Patent Application No. 2011-119165, filed on May 27, 2011, the entire contents of which are incorporated herein by reference.

FIELD

The embodiments discussed herein are related to a demodulation circuit, demodulation method and receiving apparatus.

BACKGROUND

Modulation in a transmitting apparatus for digital broadcast (for example, terrestrial digital broadcast in Japan) first maps a bit stream of a transmitting signal onto a complex plane through a mapping process. For example, in 64QAM (Quadrature Amplitude Modulation), a bit stream of a transmitting signal is segmented every 6 bits and mapped to 64 signal points on a complex plane.

Furthermore, in OFDM (Orthogonal Frequency-Division Multiplexing), the data (signal) mapped to 64 signal points on a complex plane is subjected to the IFFT (Inverse Fast Fourier Transform). Then, the digital signal having been subjected to the IFFT is converted to an analog signal, and then up-converted to a desired frequency and transmitted from an antenna.

On the other hand, demodulation in a receiving apparatus for terrestrial digital broadcast implements the opposite process to the above-described modulation. That is to say, an analog signal received by an antenna is converted to a digital signal, and furthermore, in OFDM, subjected to the FFT (Fast Fourier Transform) and propagation path equalization.

Furthermore, according to the above-described mapping arrangement, for example, in 64QAM, the signal after propagation path equalization is subjected to a demapping process to find the likelihood values (values to indicate which one of "0" and "1" is closer)) of the above 6 bits.

At this time, unlike the above-described case of modulation, noise, multiple paths (reflections of electromagnetic waves) and fading (frequency variation of electrical waves produced in reception during move) are produced on the propagation path, and therefore information that is deviated from the transmitting point is received.

Here, on I/Q coordinates (constellation) after propagation path equalization, detecting the transmitting point that is the closest a receiving point and assigning that transmitting point to each corresponding bit is a hard decision process, and quantizing the signal point assigned to each corresponding bit through the hard decision process by a plurality of bits and then performing decoding by finding how likely each bit subjected to the hard decision process is, is a soft decision process.

That is to say, in a hard decision process, every one bit is determined to be a binary signal of "0" or "1," based on one threshold value, and, in a soft decision process, every one bit is determined as a multi-valued signal based on a plurality of threshold values.

As mentioned above, for example, in a digital broadcast demodulation circuit, a soft decision process to determine every one bit as a multi-valued signal based on a plurality of threshold values is performed.

Heretofore, to improve reception performance, the resolution (dividing values) of soft decision is increased by, for example, increasing the number of soft decision bits to use in the soft decision process.

However, increasing the number of soft decision bits results in an increased amount of information, which then causes an increase of circuit to perform process and power consumption and furthermore it becomes difficult to improve reception performance even if the number of soft decision bits is increased to a certain degree.

By the way, various digital broadcast receiving apparatuses (demodulation circuits) have been proposed heretofore.

Patent Document 1: Japanese Laid-open Patent Publication No. 2008-010987

SUMMARY

According to an aspect of the embodiments, there is provided a demodulation circuit which includes a hard decision process unit and a soft decision process unit. The hard decision process unit is configured to perform a hard decision process using a demodulated signal, and the demodulated signal is a demodulated received signal.

The soft decision process unit is configured to determine a range of assignment with respect to a transitioning part in the demodulated signal, calculate a likelihood value of a bit, and perform a soft decision process.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 7A, FIG. 7B and FIG. 7C are drawings for explaining the demodulation method according to the present embodiment (4);

FIG. 9A, FIG. 9B and FIG. 9C are drawings for explaining the demodulation method according to the present embodiment (6);

FIG. 12 is a drawing illustrating examples of correspondence between modulation methods and coding rates, and demapping likelihood values;

FIG. 13 is a drawing for explaining an example of information to be output from a TMCC correction unit in the demapping unit of FIG. 11 (1);

FIG. 14 is a drawing for explaining an example of information to be output from a TMCC correction unit in the demapping unit of FIG. 11 (2);

FIG. 15 is a block diagram illustrating another example of a demapping unit in a demodulation circuit;

FIG. 16A, FIG. 16B, FIG. 16C and FIG. 16D illustrate examples of correspondence between various parameters and demapping likelihood values;

DESCRIPTION OF EMBODIMENTS

Before describing the embodiments of a demodulation circuit, demodulation method and receiving apparatus in detail, a demodulation circuit and its problems will be explained with reference to FIG. 1, FIG. 2 and FIG. 3.

Figure 1:
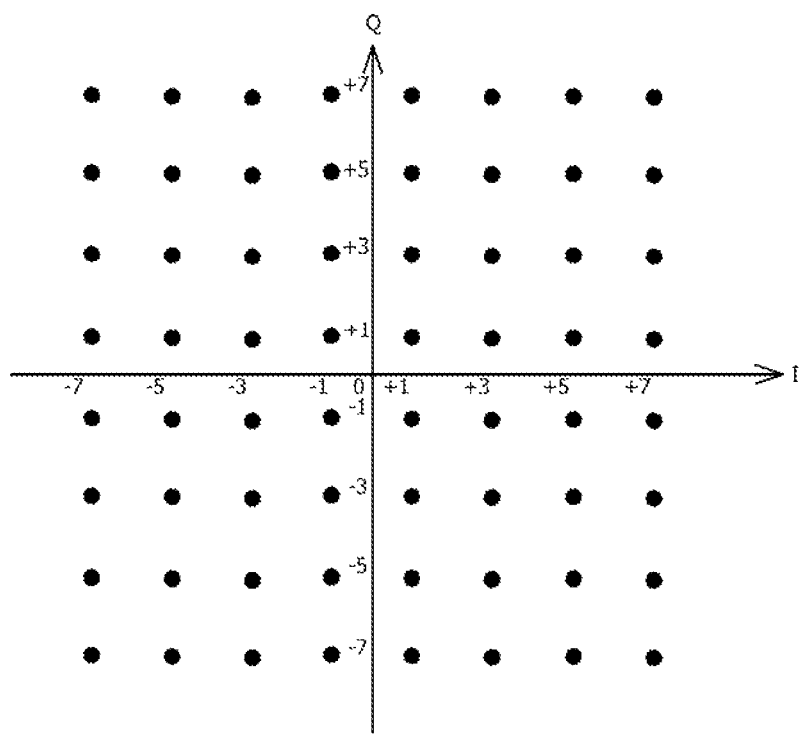
FIG. 1 is a drawing illustrating a mapping arrangement on a complex plane by 64QAM.

FIG. 1 is a drawing illustrating a mapping arrangement on a complex plane by 64QAM. As illustrated in FIG. 1, the mapping pattern on a complex plane for 64QAM provides 64 signal points (constellation points) on a complex plane defined by a horizontal axis I and a vertical axis Q.

That is to say, when the modulation method is 64QAM, for example, a bit stream of a transmitting signal for terrestrial digital broadcast is segmented every 6 bits and mapped to 64 signal points on the complex plane.

Figure 2:
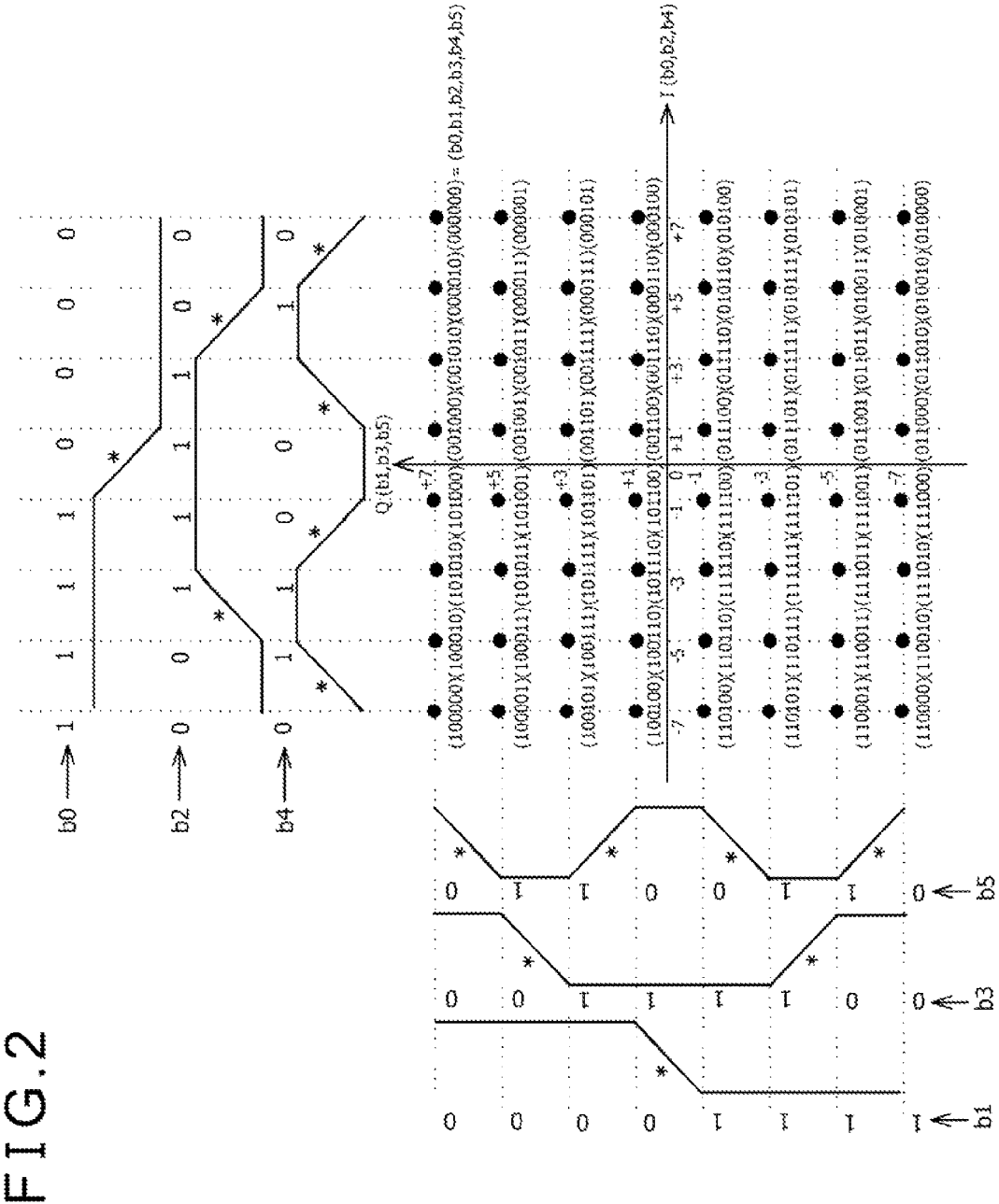
FIG. 2 is a drawing for explaining a demapping process in the mapping arrangement of FIG. 1.
Figure 3:
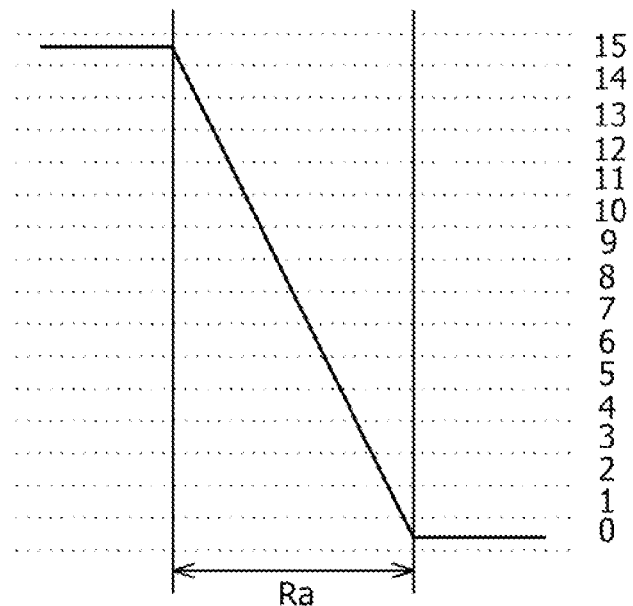
FIG. 3 is a drawing for explaining a 4-bit soft decision process.

FIG. 2 is a drawing for explaining a demapping process in the mapping arrangement of FIG. 1, and FIG. 3 is a drawing for explaining a 4-bit soft decision process.

As illustrated in FIG. 2, when the modulation method is 64QAM, a received signal having been subjected to propagation path equalization is mapped to 64 signal points on a constellation (I/Q coordinates: complex plane). Then, the signal point that is the closest in distance is specified, and this specified signal point is estimated to be a transmitting point.

That is to say, hard decision information, which includes 3 bits to represent 8 positions in the I axis direction and 3 bits to represent 8 positions in the Q axis direction, totaling 6 bits, is obtained, and this hard decision information is assigned as (b0, b1, b2, b3, b4 and b5).

Note that, when the modulation method is 16QAM, 4 bits of hard decision information combining the I axis and the Q axis is obtained, and, when the modulation method is QPSK, 2 bits of hard decision information combining the I axis and the Q axis is obtained.

By the way, based on hard decision information, for example, although it is possible to find transmitting data while performing error correction by a Viterbi decoding process, decoding errors might be produced if, for example, the receiving environment is poor.

So, not hard decision information of "0" or "1," but also soft decision information is found, by dividing between neighboring hard decision positions, and making likelihood of information of decision result be values divided between "0" to "1". By using this soft decision information, it is possible to reduce the possibility of decoding errors by a Viterbi decoding process. Note that the above-described hard decision process and soft decision process are performed in, for example, a demapping unit.

In FIG. 2, parts assigned the reference symbol "*" are parts subject to soft decision. In these soft decision parts, for example, a 4-bit soft decision process such as illustrated in FIG. 3 is performed. That is to say, in the inclined parts of the soft decision parts of "*," in a soft decision process, for example, 16 values (0 to 15) of 4 bits from "0000" to "1111" are assigned.

Demapping likelihood values found thus (values to indicate which one of "0" and "1" is closer) are, for example, input to an error correction unit in a later stage and subjected to error correction, and transmitting points are recovered. That is to say, data to which a soft decision process is applied is subjected to, for example, a process of removing errors by applying error correction such as Viterbi decoding, so that the process in a demapping unit is an important process for improvement of reception performance.

By the way, in a demapping unit, a general technique of improving reception performance is to simply increase the number of soft decision bits and increase the resolution of soft decision.

However, increasing the number of soft decision bits results in increasing the volume of information, and, for example, it may become to increase memory capacity for performing a soft decision process, which then leads to increasing the circuit scale and power consumption. Furthermore, when the number of soft decision bits is increased to a certain degree, it becomes difficult to improve reception performance by increasing it further.

Embodiments of a demodulation circuit, demodulation method and receiving apparatus will be explained below in detail with reference to the accompanying drawings. First, the demodulation method according to the present embodiment is configured to switch the calculation of demapping likelihood values (the likelihood values of demapped bits: values to indicate which one of "0" and "1" is closer) according to the receiving parameters, prepare a plurality of patterns of likelihood value inclinations, and select an optimal one.

Here, the inclination of demapping likelihood values relates to the range of assignment with respect to the transitioning parts in demodulated signals after the demapping process, and so making the inclination moderate corresponds to making the range of assignment larger. Note that the receiving parameters include, for example, the modulation method and coding rate to use.

Furthermore, the demodulation method according to the present embodiment may be configured to switch the calculation of demapping likelihood values according to the receiving environment, not the receiving parameters, prepare a plurality of patterns of likelihood value inclinations, and select an optimal one.

That is to say, it is possible to prepare a plurality of patterns of inclinations of demapping likelihood values (the range of assignment with respect to the transitioning parts in demodulated signals after a demapping process) and select an optimal combination according to the receiving environment. Note that the receiving environment includes, for example, the MER (Modulation Error Rate), delay information and fading level.

Given the above, it is naturally understood that the calculation of demapping likelihood values may be switched depending on both the receiving parameters and the receiving environment. Also, parts where the inclination of demapping likelihood values (the range of assignment) is controlled are not limited to parts where hard decision data reliably changes from "0" to "1" or from "1" to "0." That is to say, parts where a certain first level changes to a second level that differs from that first level, are applicable.

By the way, by making the inclination of demapping likelihood values moderate, that is to say, by making the range of assignment larger, a plurality of soft decision positions might be produced. In this way, in the event a plurality of soft decision positions are produced, as will be described later, it is possible to cooperate with this situation by, for example, executing a compression process to prevent the memory to use upon performing deinterleaving in a later stage from increasing.

Figure 4:
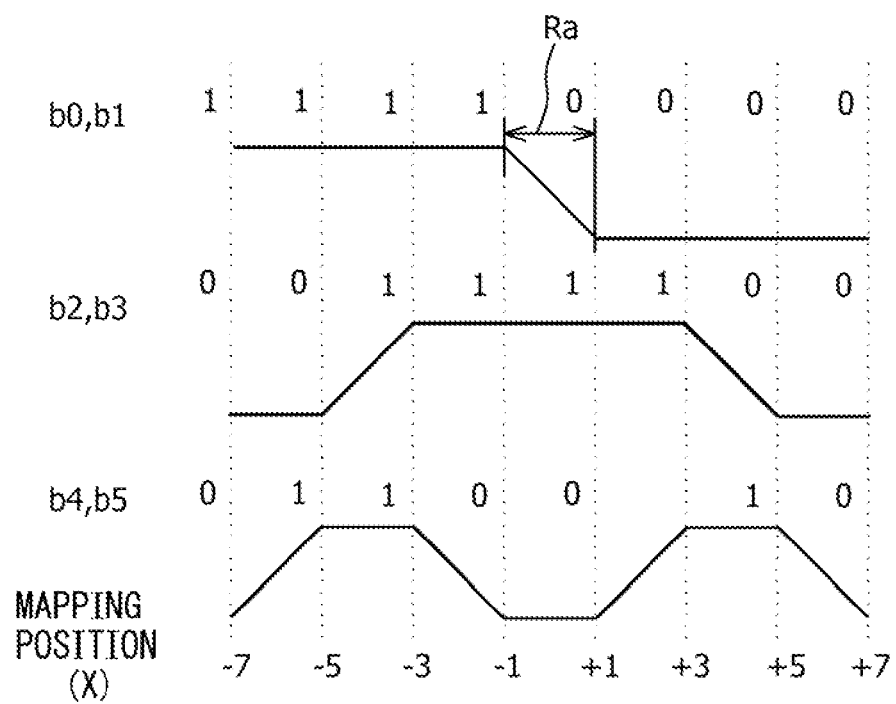
FIG. 4 is a drawing for explaining a demodulation method according to the present embodiment (1)
Figures 5, 6:
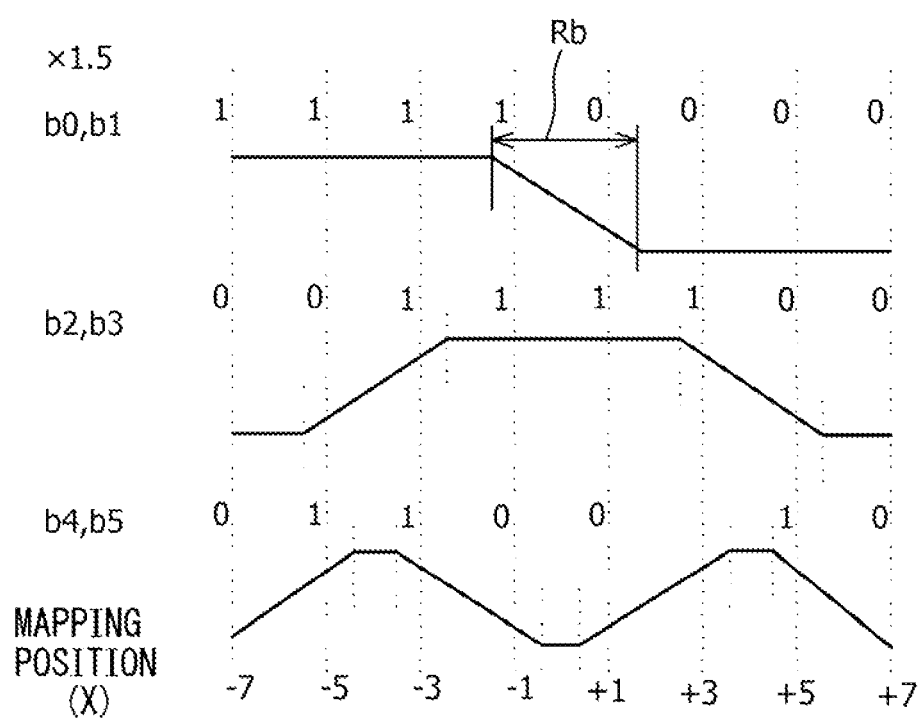
FIG. 5 is a drawing for explaining a demodulation method according to the present embodiment (2)
FIG. 6 is a drawing for explaining a demodulation method according to the present embodiment (3)

FIG. 4, FIG. 5, FIG. 6, FIG. 7A, FIG. 7B, FIG. 7C, FIG. 8, FIG. 9A, FIG. 9B and FIG. 9C are drawings for explaining the demodulation method according to the present embodiment. Here, FIG. 4 and FIG. 5 illustrate cases where, in a demodulated signal having been subjected to a demapping process by 64QAM, the range of assignment is 1 times a transitioning part. FIG. 6, FIG. 7A, FIG. 7B and FIG. 7C illustrate a range of assignment that is 1.5 times, and FIG. 8, FIG. 9A, FIG. 9B and FIG. 9C illustrate a range of assignment that is 2 times.

Figure 8:
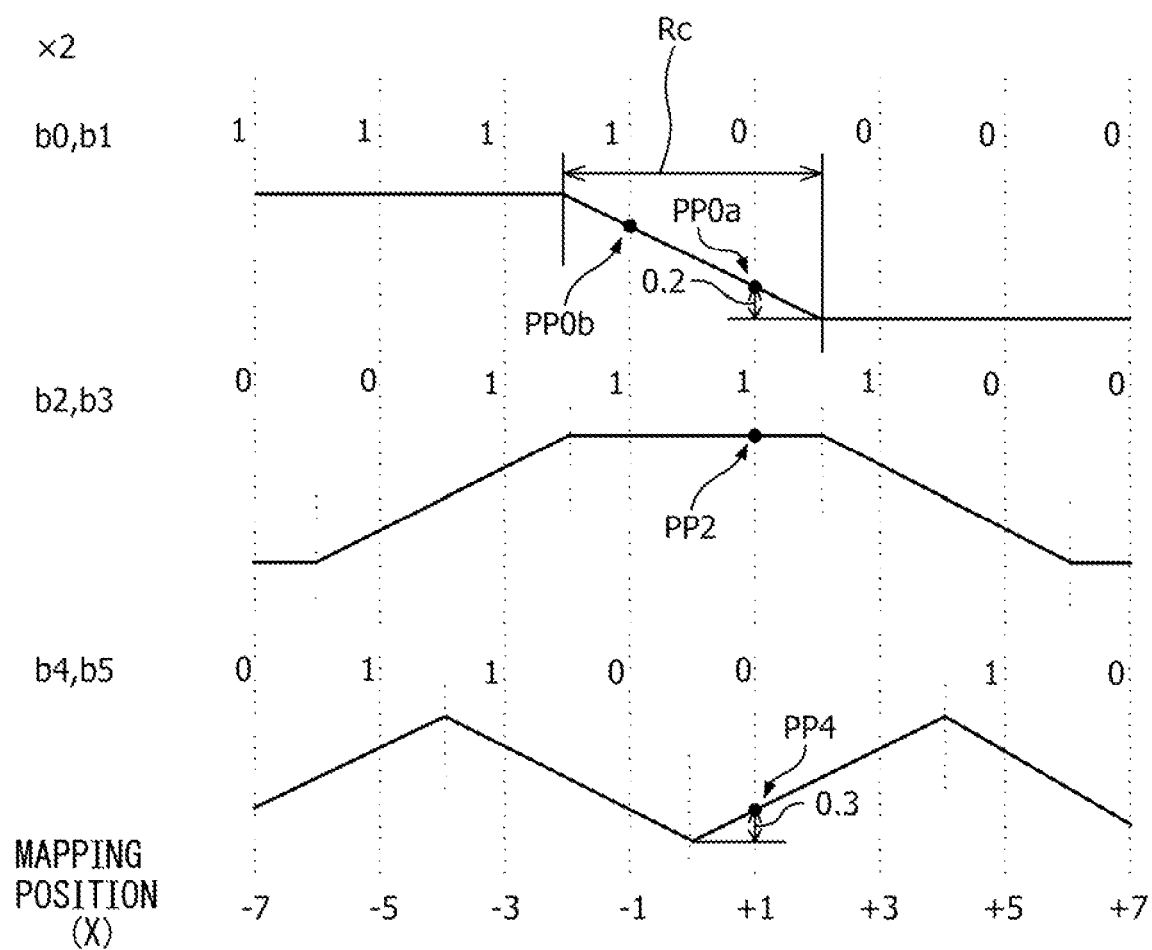
FIG. 8 is a drawing for explaining the demodulation method according to the present embodiment (5)

Note that FIG. 4, FIG. 6 and FIG. 8 illustrate demodulated signals of bits after a demapping process, for mapping positions (X) from −7 to +7. FIG. 5, FIG. 7A, FIG. 7B, FIG. 7C, FIG. 9A, FIG. 9B and FIG. 9C illustrate the relationships between the mapping positions of bits and demapping results.

Also, in FIG. 4, FIG. 6 and FIG. 8, the transitioning parts where assignment range (inclination) patterns of different scale factors are prepared are parts where hard decision data changes from "0" to "1" or from "1" to "0," but this is by no means limiting. That is to say, a part where data by a soft decision process changes may be a transitioning part as well.

First, FIG. 4 and FIG. 5 illustrate cases where, in demodulated signals having been subjected to a demapping process by 64QAM, the range of assignment is 1 times (that is, the same as) a transitioning part. That is to say, the assignment range Ra in FIG. 4 matches 2 scales in mapping position (X).

Note that this assignment range Ra relates to, for example, the inclination of parts transitioning from "1" to "0" or the inclination of parts transitioning from "0" to "1," and, when Ra widens (that is, when its scale factor increases), the inclination becomes more moderate.

As illustrated in FIG. 5, in a demodulated signal having been subjected to a demapping process by 64QAM, when the range of assignment is 1 times a transitioning part (and the demapping likelihood value inclination is also 1 times), X becomes "1" in −7 to −5, −5 to −3 and −3 to −1 in the hard decision parts for bits b0 and b1. Also, X becomes "0" in +1 to +3, +3 to +5 and +5 to +7. Note that, in the soft decision parts of bits b0 and b1, X becomes "(1−X)/2" in −1 to +1.

Furthermore, when the range of assignment is 1 times, in the hard decision parts for bits b2 and b3, X becomes "1" in −3 to −1, −1 to +1 and +1 to +3, and also X becomes "0" in −7 to −5 and +5 to +7. Note that, in the soft decision parts of bits b2 and b3, X becomes "(5+X)/2" in −5 to −3 and +3 to +5.

Then, when the range of assignment is 1 times, in the hard decision parts for bits b4 and b5, X becomes "1" in −5 to −3 and +3 to +5, and also X becomes "0" in −1 to +1.

Note that, in the soft decision parts of bits b4 and b5, X becomes "(7+X)/2" in −7 to −5, X becomes "(−1−X)/2" in −3 to −1, X becomes "(31 1+X)/2" in +1 to +3, and X becomes "(7−X)/2" in +5 to +7.

Here, with the actual demapping likelihood values, for example, when the received C/N (carrier/noise ratio) is lower, that is, when there is more noise, the inclination of likelihood becomes more moderate (that is, the range of assignment becomes wider), from the relationship with normal distribution. This is because the certainty of a receiving point becomes lower when the received C/N is lower. Taking this into account, a case will be described below where the inclination of likelihood is made moderate.

FIG. 6, FIG. 7A, FIG. 7B and FIG. 7C illustrate a case where, in demodulated signals having been subjected to a demapping process by 64QAM, the range of assignment is 1.5 times a transitioning part (that is, the inclination of demapping likelihood values is ⅔ times). That is to say, in the demodulated signals having been subjected to a demapping process in FIG. 6, the assignment range Rb with respect to a transitioning part matches 3 scales in mapping position (X).

Here, FIG. 7A illustrates the relationship between the mapping positions of bits b0 and b1 and demapping results, and FIG. 7B illustrates the relationship between the mapping positions of bits b2 and b3 and demapping results. FIG. 7C illustrates the relationship between the mapping positions of bits b4 and b5 and demapping results.

First, as illustrated in FIG. 7A, when the range of assignment is 1.5 times, in the hard decision parts for bits b0 and b1, X becomes "1" in −7 to −5, −5 to −3 and −3 to −1.5, and also X becomes "0" in +1.5 to +3, +3 to +5 and +5 to +7. Note that, in the soft decision parts for bits b0 and b1, X becomes "(1.5−X)/3" in −1.5 to +1.5.

That is to say, in the soft decision parts of bits b0 and b1, the assignment range Rb with respect to a transitioning part in a demodulated signal matches 3 scales, which is 1.5 times the assignment range Ra illustrated in FIG. 4. Consequently, the inclination of demapping likelihood values becomes moderate at 1/1.5 (⅔).

Furthermore, as illustrated in FIG. 7B, when the range of assignment is 1.5 times, in the hard decision parts for bits b2 and b3, X becomes "1" in −2.5 to −1, −1 to +1 and +1 to +2.5, and also X becomes "0" in −7 to −5.5 and +5.5 to +7.

Note that, in the soft decision parts for bits b2 and b3, X becomes "(5.5+X)/3" in −5.5 to −2.5, and also X becomes "(5.5−X)/3" in +2.5 to +5.5.

Furthermore, as illustrated in FIG. 7C, when the range of assignment is 1.5 times, in the hard decision parts for bits b4 and b5, X becomes "1" in −4.5 to −3.5 and +3.5 to +4.5, and also X becomes "0" in −0.5 to +0.5.

Note that, in the soft decision parts for bits b4 and b5, X becomes "(7.5+X)/3" in −7 to −4.5, and also X becomes "(−0.5−X)/3" in −3.5 to −0.5. Furthermore, X becomes "(−0.5+X)/3" in +0.5 to +3.5, and X becomes "(7.5−X)/3" in +4.5 to +7.

FIG. 8, FIG. 9A, FIG. 9B and FIG. 9C illustrate a case where, in demodulated signals having been subjected to a demapping process by 64QAM, the range of assignment is 2 times a transitioning part (that is, the inclination of demapping likelihood values is ½ times). That is to say, in the demodulated signals having been subjected to a demapping process in FIG. 5, the assignment range Rc with respect to a transitioning part matches 4 scales in mapping position (X).

Here, FIG. 9A illustrates the relationship between the mapping positions of bits b0 and b1 and demapping results, and FIG. 9B illustrates the relationship between the mapping positions of bits b2 and b3 and demapping results. FIG. 9C illustrates the relationship between the mapping positions of bits b4 and b5 and demapping results.

First, as illustrated in FIG. 9A, when the range of assignment is 2.0 times, in the hard decision parts for bits b0 and b1, X becomes "1" in −7 to −5, −5 to −3 and −3 to −2, and also X becomes "0" in +2 to +3, +3 to +5 and +5 to +7. Note that, in the soft decision parts for bits b0 and b1, X becomes "(2−X)/4" in −2 to +2.

That is to say, in the soft decision parts of bits b0 and b1, the assignment range Rc with respect to a transitioning part in a demodulated signal matches 4 scales, which is 2 times the assignment range Ra illustrated in FIG. 4. Consequently, the inclination of demapping likelihood values becomes even more moderate at ½.

Also, as illustrated in FIG. 9B, when the range of assignment is 2 times, in the hard decision parts for bits b2 and b3, X becomes "1" in −2 to −1, −1 to +1 and +1 to +2, and also X becomes "0" in −7 to −6 and +6 to +7.

Note that, in the soft decision parts for bits b2 and b3, X becomes "(6+X)/4" in −6 to −2, and also X becomes "(6−X)/4" in +2 to +6.

Furthermore, as illustrated in FIG. 9C, in an assignment range that is 2 times, with bits b4 and b5, all becomes soft decision parts. That is to say, X becomes "(8+X)/4" in −7 to −4, X becomes "(−X)/4" in −4 to 0, X becomes "X/4" in +0 to +4, and X becomes "(8−X)/4" in +4 to +7.

Then, the modulation method of the present embodiment is designed to select an optimal pattern from a plurality of patterns that are prepared in advance, according to the receiving parameters, and, based on the selected pattern, calculate likelihood values. Note that the receiving parameters include, for example, the modulation method and coding rate to use.

Furthermore, the modulation method according to the present embodiment may be designed to select an optimal pattern from a plurality of patterns that are prepared in advance, according to the receiving environment, and, based on the selected pattern, calculate likelihood values. Note that the receiving environment includes, for example, the MER, delay information and fading level.

Although 3 patterns are described above where, in a demodulated signal having been subjected to a demapping process by 64QAM, the range of assignment is 1 times, 1.5 times, and 2 times a transitioning part, that is, the inclination of demapping likelihood values is 1 times, ⅔ times and ½ times, these are by no means limiting. That is to say, it is possible to prepare a plurality of patterns including ones in which the range of assignment is 2.5 times or 3 times, and switch between them according to the receiving parameters and receiving environment. Furthermore, it is naturally understood that the application of the present embodiment is not limited to the 64QAM modulation method.

Figure 10:
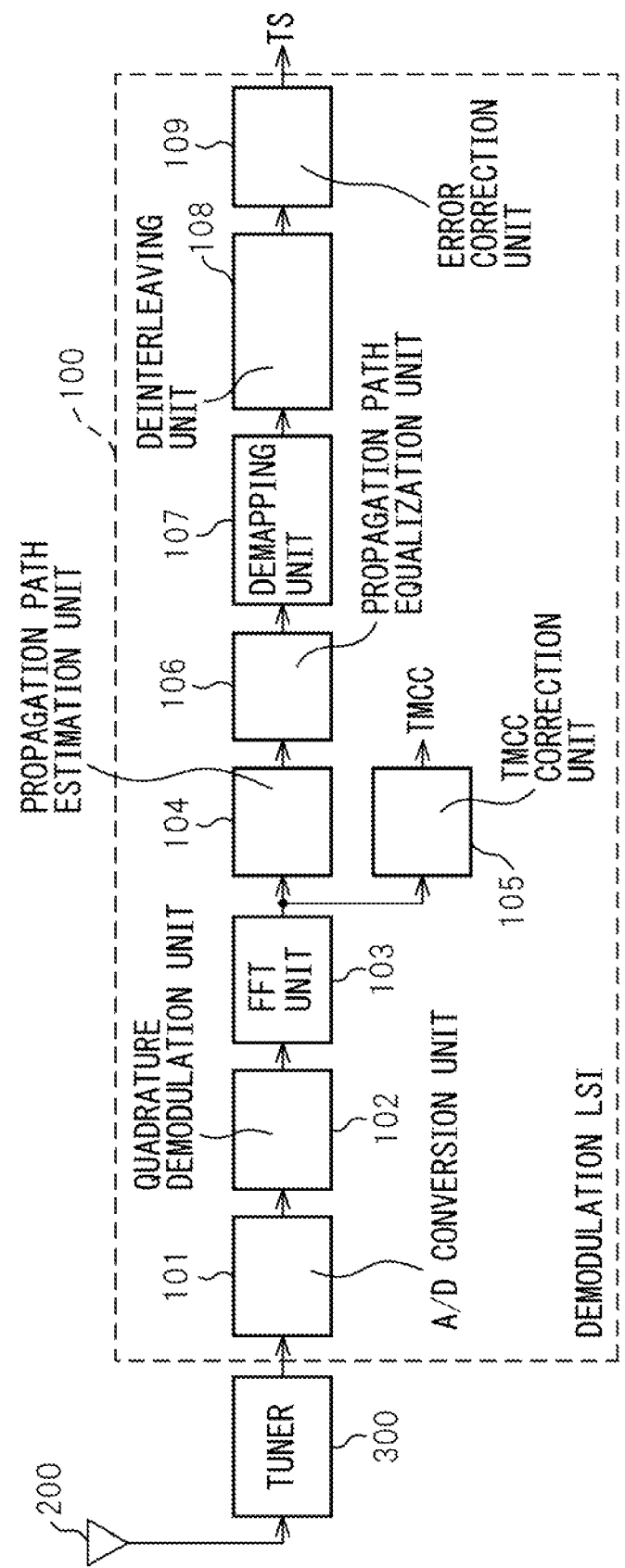
FIG. 10 is a block diagram illustrating an example of an overall configuration of a demodulation circuit according to the present embodiment.

FIG. 10 is a block diagram illustrating an example of an overall configuration of a demodulation circuit according to the present embodiment, and illustrates a demodulation circuit (demodulation LSI) 100, an antenna 200 and a tuner 300 that comply with terrestrial digital broadcast (ISDB-T: Integrated Service Digital Broadcasting-Terrestrial).

As illustrated in FIG. 10, the antenna 200, for example, receives a high frequency signal modulated by a digital signal of an OFDM system, and this received high frequency signal is input to the tuner 300.

The tuner 300, for example, selects the channel to receive, converts the high frequency signal of that selected channel into an intermediate frequency (IF) and outputs this intermediate frequency to an A/D (analog/digital) converter 101. The A/D converter 101 converts the intermediate frequency signal, which is an analog signal, into a digital signal.

The output of the A/D converter 101 is input to a quadrature demodulating unit 102 and converted into a complex baseband signal. Furthermore, the complex baseband signal is subjected to the fast Fourier transform (FFT) in an FFT unit 103 and converted from a time domain signal into a frequency domain signal.

Then, the output signal (data carrier) of the FFT unit 103 is input to a propagation path estimation unit 104 and a TMCC correction unit 105. The propagation path estimation unit 104, for example, first calculates the propagation characteristic of the propagation path through which the OFDM signal is transmitted, for waveform equalization, and outputs that calculation result to a channel equalization unit 106.

The channel equalization unit 106, for example, performs a pilot signal interpolation process and a data carrier equalization process using that, and outputs a equalized data signal (demodulated data) to a demapping unit 107.

The TMCC correction unit 105, having received the output signal of the FFT unit 103, performs error correction for TMCC (Transmission and Multiplexing Configuration Control) information, and outputs a TMCC signal.

Here, TMCC information is control information to represent, for example, the transmission parameters such as the modulation method used for each carrier and the interleaving length in time interleaving. Note that the TMCC information subjected to error correction is used in each part of the receiving apparatus. That is to say, for example, as will be explained later with reference to FIG. 11, the output signal (modulation method information and coding rate information) of the TMCC correction unit 105 is input to the demapping unit 107 and used.

The demapping unit 107 receives demodulated data from the channel equalization unit 106 and TMCC information from the TMCC correction unit 105, and performs a demapping process. Note that each embodiment of the demapping unit 107 will be explained later in detail with reference to, for example, FIG. 11 and FIG. 15.

The output signal of the demapping unit 107 is input to a deinterleaving unit 108 and subjected to a deinterleaving process, which is the opposite conversion to the interleaving process performed in the transmitting apparatus (transmitting station). Here, the deinterleaving process is a process of rearranging the data sequence in a certain time frame according to a certain algorithm.

Figure 11:
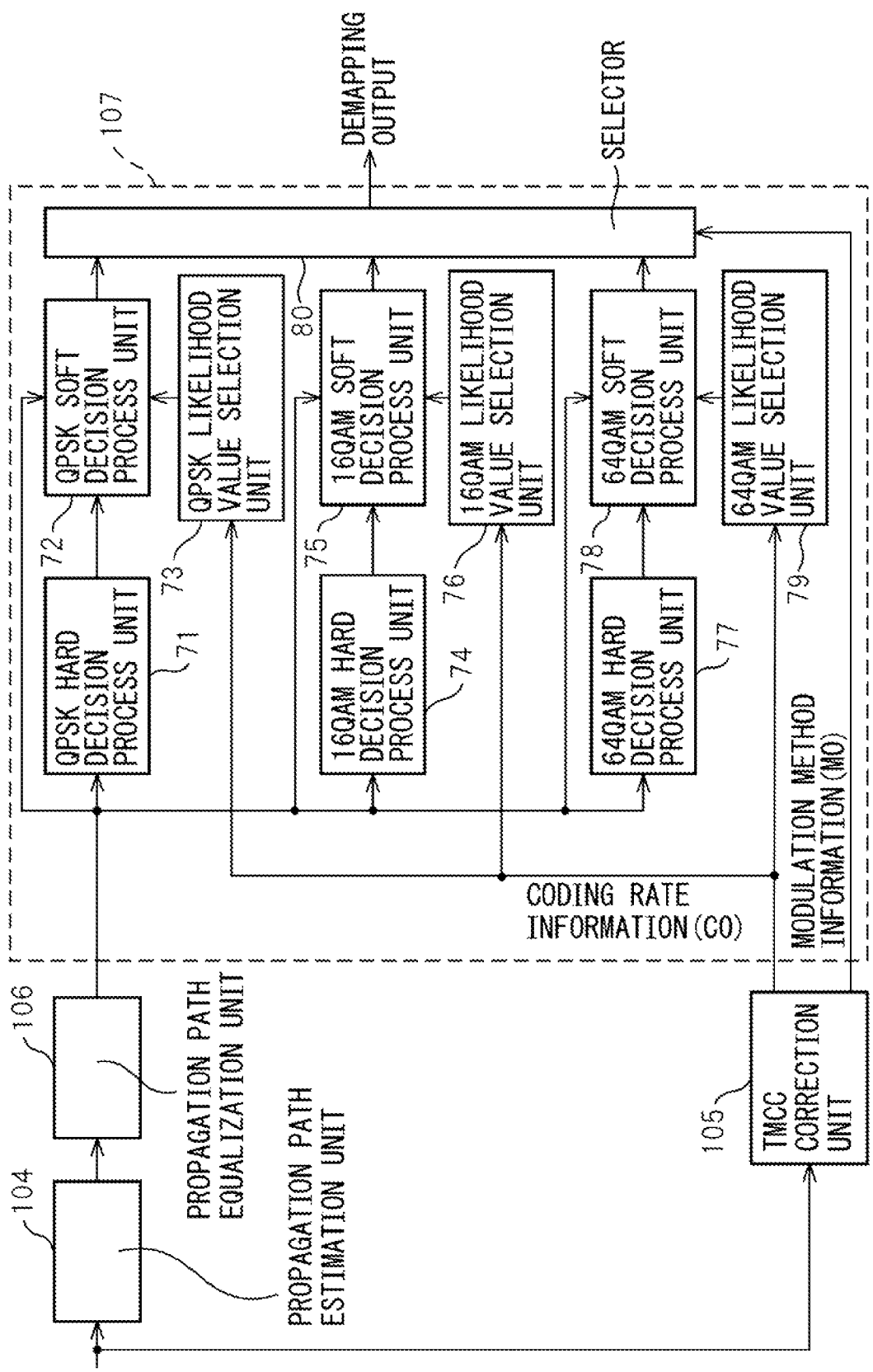
FIG. 11 is a block diagram illustrating an example of a demapping unit in the demodulation circuit of FIG. 10.

An error correction unit 109 receives the output signal (transmitting data converted into one bit or a plurality of bits of binary data) of the deinterleaving unit 108, performs a correction process, and outputs a TS (Transform Stream) format signal. Note that this TS format signal is converted into a video and audio signal by a decoder. FIG. 11 is a block diagram illustrating an example of a demapping unit in the demodulation circuit of FIG. 10, and illustrates an embodiment that switches the candidates of likelihood values according to the modulation method (QPSK, 16QAM and 64QAM).

As illustrated in FIG. 11, for QPSK, 16QAM and 64QAM, respectively, the demapping unit 107 has hard decision process units 71, 74 and 77, soft decision process units 72, 75 and 78, and likelihood value selection units 73, 76 and 79.

Also, for each of the modulation methods of QPSK, 16QAM and 64QAM, a plurality of likelihood value tables corresponding to coding rates are prepared in advance, and, according to the actual modulation method and coding rate, an optimal likelihood value table is selected and a soft decision process is performed.

That is to say, the demapping unit 107 includes a QPSK hard decision process unit 71, a QPSK soft decision process unit 72 and a QPSK likelihood value selection unit 73, a 16QAM hard decision process unit 74, a 16QAM soft decision process unit 75 and a 16QAM likelihood value selection unit 76. Furthermore, the demapping unit 107 includes a 64QAM hard decision process unit 77, a 64QAM soft decision process unit 78, a 64QAM likelihood value selection unit 79, and a selector 80.

First, QPSK hard decision process unit 71, 16QAM hard decision process unit 74 and 64QAM hard decision process unit 77 perform hard decision process in their respective modulation methods, namely QPSK (Quadrature Phase Shift Keying), 16QAM and 64QAM.

Also, the QPSK soft decision process unit 72, 16QAM soft decision process unit 75 and 64QAM soft decision process unit 78 perform a soft decision process in their respective modulation methods, namely QPSK, 16QAM and 64QAM.

Then, the QPSK likelihood value selection unit 73, 16QAM likelihood value selection unit 76 and 64QAM likelihood value selection unit 79 each select an optimal pattern matching coding rate information, from a plurality of patterns prepared in advance.

Note that the patterns selected by the QPSK likelihood value selection unit 73, 16QAM likelihood value selection unit 76 and 64QAM likelihood value selection unit 79 are input to the corresponding QPSK soft decision process unit 72, 16QAM soft decision process unit 75 and 64QAM soft decision process unit 78 respectively.

Then, the QPSK soft decision process unit 72, 16QAM soft decision process unit 75 and 64QAM soft decision process unit 78 perform a soft decision process according to the likelihood value tables selected in the QPSK likelihood value selection unit 73, 16QAM likelihood value selection unit 76 and 64QAM likelihood value selection unit 79, respectively.

The selector 80 receives the output signals of the QPSK soft decision process unit 72, 16QAM soft decision process unit 75 and 64QAM soft decision process unit 78, and outputs signal selected from these output signals according to the modulation method information, as a demapping output. Note that coding rate information (C0) and modulation method information (M0) are output from the TMCC correction unit 105. As described above, the demapping unit 107 selects an optimal pattern from a plurality of patterns that are prepared in advance, according to the modulation method M0 and coding rate C0, and, using that selected pattern, calculates demapping likelihood value and outputs demapping outputs.

To be more specific, for the modulation methods of QPSK, 16QAM, 64QAM, for example, when code point positions become closer, that is, especially in 64QAM, a pattern of more moderately inclined demapping likelihood values is used.

In other words, given the same coding rate, the 64QAM likelihood value selection unit 79 selects a less inclined pattern than the pattern which the 16QAM likelihood value selection unit 76 selects, that is, selects a pattern of a wider assignment pattern.

Furthermore, given the same coding rate, the 16QAM likelihood value selection unit 76 selects a less inclined pattern than the pattern which the QPSK likelihood value selection unit 73 selects, that is, selects a pattern of a wider assignment pattern.

FIG. 12 is a drawing illustrating examples of correspondence between modulation methods and coding rates, and demapping likelihood values. To be more specific, given the same 64QAM modulation method, the 64QAM likelihood value selection unit 79 selects a pattern in which the range of assignment is 1.0 times with respect to the coding rate C0 of ⅞ to use for convolutional code, and selects a pattern in which the range of assignment is 1.5 times with respect to the C0 of ⅚.

Furthermore, the 64QAM likelihood value selection unit 79 selects a pattern in which the range of assignment is 2.5 times with respect to the coding rate C0 of ¾, and selects a pattern in which the range of assignment is 3.0 times with respect to the C0 of ⅔. Also, the 64QAM likelihood value selection unit 79 selects a pattern in which the range of assignment is 4.0 times with respect to the coding rate C0 of ½.

Likewise, given the same 16QAM modulation method, the 16QAM likelihood value selection unit 76 selects a pattern in which the range of assignment is 1.0 times with respect to the coding rate C0 of ⅞ to use for convolutional code, and selects a pattern in which the range of assignment is 1.5 times with respect to the C0 of ⅚.

Furthermore, the 16QAM likelihood value selection unit 76 selects a pattern in which the range of assignment is 2.0 times with respect to the coding rate C0 of ¾, and selects a pattern in which the range of assignment is 2.5 times with respect to the C0 of ⅔. Also, the 16QAM likelihood value selection unit 76 selects a pattern in which the range of assignment is 3.0 times with respect to the coding rate C0 of ½.

In this way, given the same modulation method, when the coding rate is lower, that is, when the coding rate is closer to ½, reception at lower received C/N is possible, so that, by using a pattern of a moderate inclination, that is, by using a pattern of a wide assignment range, it is possible to improve reception performance.

Meanwhile, given the same coding rate, or, to be more specific, given the same coding rate C0 of ⅚, the 64QAM likelihood value selection unit 79 and the 16QAM likelihood value selection unit 76 select a pattern in which the range of assignment is 1.5 times. Also, the QPSK likelihood value selection unit 73 selects a pattern in which the range of assignment is 1.0 times.

Moreover, given the same coding rate C0 of 3/4, the 64QAM likelihood value selection unit 79 selects a pattern in which the range of assignment is 2.5 times, and the 16QAM likelihood value selection unit 76 selects a pattern in which the range of assignment is 2.0 times. The 16QAM likelihood value selection unit 73 selects a pattern in which the range of assignment is 1.5 times.

In this way, given the same coding rate, with parameters in which the code point positions are closer, that is, especially in 64QAM, code point positions may vary more accordingly, so that, by using a pattern of a moderate inclination, that is, by using a pattern of a wide assignment range, it is possible to improve reception performance.

FIG. 13 and FIG. 14 are drawings for explaining an example of information output from the TMCC correction unit in the demapping unit of FIG. 11. That is to say, the TMCC correction unit 105 outputs 204-bit TMCC information as illustrated in FIG. 13.

Here, modulation method information (M0) is assigned to the 28th through 30th bit, 41st through 43rd bit and 54th through 56th bit, and convolutional coding rate information (C0) is assigned to the 31st through 33rd bit, 44th through 46th bit, and 57th through 59th bit.

That is to say, as illustrated in FIG. 14, the modulation methods of, for example, DQPSK, QPSK, 16QAM and 64QAM are defined by the above-described modulation method information (M0) of the 28th through 30th bit, 41st through 43rd bit, and 54th through 56th bit.

Furthermore, the convolutional coding rates of, for example, ½, ⅔, ¾, ⅚ and ⅞ are defined by the above-described convolutional coding rate information (C0) of the 31st through 33rd bit, 44th through 46th bit, and 57th through 59th bit.

FIG. 15 is a block diagram illustrating another example of a demapping unit in a demodulation circuit, and illustrates an embodiment that switches the candidates of likelihood values according to the receiving environment (including, for example, MER, delay information, and fading level). That is to say, the received C/N is predicted based on the MER, and then a pattern to include a matching inclination of demapping likelihood values (assignment range) is selected, so that optimal soft decision is regularly performed.

Here, when there are fading and multiple paths, distortion is produced on the constellation, and the received C/N at which reception is actually possible becomes higher than when these do not exist. Consequently, fading and multiple paths are numeralized using pilot signals, and patterns are selected to make the inclination steeper (that is, to make the range of assignment narrower) when their values are bigger.

First, as illustrated in FIG. 15, for QPSK, 16QAM and 64QAM, respectively, the demapping unit 107 has hard decision process units 171, 174 and 177, soft decision process units 172, 175 and 178, and likelihood value selection units 173, 176 and 179.

The likelihood value selection units 173, 176, and 179 prepare a plurality of likelihood value tables per, for example, the MER, delay information, and fading level. Then, a soft decision process is performed by selecting optimal likelihood value tables according to the actual MER, delay information and fading level.

Here, as clear from the comparison of FIG. 15 and FIG. 11 described earlier, with the present embodiment, furthermore, a delay profile acquiring unit 110 that receives an output of the propagation path estimation unit 104 and outputs delay information and fading level, is provided.

Also, the demapping unit 107 further includes a selector 181 that receives the outputs of the hard decision process units 171, 174 and 177 of respective modulation methods and selects according to modulation method information from the TMCC correction unit 105, and an MER calculation unit 182. Here, the MER calculation unit 182 calculates the MER of the output of selector 181 and outputs the calculated MER to the likelihood value selection units 173, 176 and 179 of respective modulation methods.

Note that the blocks 171 to 180 in FIG. 15 correspond to the blocks 71 to 80 in FIG. 11. Note that the QPSK likelihood value selection unit 173, 16QAM likelihood value selection unit 176 and 64QAM likelihood value selection unit 179 of the present embodiment receive the output of the delay profile acquiring unit 110 and the output of the MER calculation unit 182, and select the likelihood values.

That is to say, the QPSK likelihood value selection unit 173 receives, for example, the delay information and fading level from the delay profile acquiring unit 110 and the MER of QPSK from the MER calculation unit 182, and selects a corresponding optimal likelihood value table.

Also, the 16QAM likelihood value selection unit 176 receives, for example, the delay information and fading level from the delay profile acquiring unit 110 and the MER of 16QAM from the MER calculation unit 182, and selects a corresponding optimal likelihood value table.

Furthermore, the 64QAM likelihood value selection unit 179 receives, for example, the delay information and fading level from the delay profile acquiring unit 110 and the MER of 64QAM from the MER calculation unit 182, and selects a corresponding optimal likelihood value table.

Then, soft decision process units 172, 175 and 178 of respective modulation methods perform a soft decision process according to the likelihood value tables selected in the likelihood value selection units 173, 176 and 179 of respective modulation methods, respectively. After this, the selector 180 receives the output signals of the soft decision process units 172, 175 and 178 of respective modulation methods, and outputs signal selected from these output signals according to the modulation method information, as a demapping output.

Here, with the above-described embodiment, although the MER, delay information and fading level may be given and described as the receiving environment, for example, it is possible to predict the received C/N based on the MER alone, select a matching likelihood value inclination (assignment range), and perform a soft decision. Also, it is naturally understood that the receiving environment is not limited to the MER, delay information and fading level.

FIG. 16A, FIG. 16B, FIG. 16C and FIG. 16D illustrate examples of correspondence between various parameters and demapping likelihood values, where FIG. 16A, FIG. 16B, and FIG. 16C illustrate the selection patterns (assignment range scale factors) with respect to the MER, delay information, and fading level, for QPSK, 16QAM and 64QAM. Also, FIG. 16D illustrates an example of a table classifying delay information and fading levels.

To be more specific, as illustrated in FIG. 16A, in the event the modulation method is QPSK, when, for example, the MER is 7 dB or lower, the 1.5-times assignment range is selected if the delay information and fading level are "low" and "medium," or the 1.0-times assignment range is selected if the delay information and fading level are "high." Note that, when the MER is 7 dB or higher, the 1.0-times assignment range is selected regardless of whether the delay information and fading level are "low," "medium" or "high." When the MER is 7 dB just, it may be classified either way, and may be, for example, used as "7 dB or higher."

Also, as illustrated in FIG. 16B, in the event the modulation method is 16QAM, when, for example, the MER is 16 dB to 13 dB (13 dB or lower), the 2.0-times assignment range is selected if the delay information and fading level are "low." Furthermore, the 1.5-times assignment range is selected if the delay information and fading level are "medium," or the 1.0-times assignment range is selected if the delay information and fading level are "high."

Moreover, as illustrated in FIG. 16C, in the event the modulation method is 64QAM, when, for example, the MER is 16 dB to 13 dB (13 dB or lower), the 3.0-times assignment range is selected if the delay information and fading level are "low."

Also, the 2.5-times assignment range is selected if the delay information and fading level are "medium," or the 1.5-times assignment range is selected if the delay information and fading level are "high."

In this way, for example, given the same modulation method, when the MER is higher, and, also, when delay information and fading level are lower, a pattern with a more moderate demapping likelihood value inclination, that is, a pattern with a wider assignment range, is selected.

Here, the classifications of delay information and fading levels ("high," "medium," and "low") may be determined according to, for example, the values of delay information and fading level, as illustrated in FIG. 16D.

That is to say, for example, when the modulation method is QPSK, "high," "medium" and "low" may be assigned based on the condition whether delay information is 0 μS, is the guard interval length or less, or is the guard interval length or greater, and, as for the fading level, based on the condition whether the fading level is 0 Hz, 70 Hz or less, or 70 Hz or greater.

Note that, in FIG. 16A, FIG. 16B, FIG. 16C and FIG. 16D, the conditions "equal or greater" and "equal or less" are used for classification, when a value matches the condition exactly, the value may be classified either way, and, for example, may be placed in the classification of "equal or greater." To be more specific, for example, referring to FIG. 16A, when the MER is just 7 dB, this MER may be processed as "7 dB or higher," for example.

Also, the conditions for delay information and fading level and the 3 classifications of "high," "medium" and "low" are simply examples, and more classifications (5 classifications, for example) are possible. Furthermore, it is naturally understood that, including the above-described conditions for the modulation method and coding rate, it is possible to prepare a plurality of likelihood value tables and select an optimal table from these tables.

Thus, with the present embodiment, it is possible to prepare a plurality of likelihood value tables in advance, select an adequate likelihood value tables according to conditions of, for example, the modulation method, coding rate, MER, delay information and fading level, and perform a soft decision process based on that likelihood value table.

Note that the likelihood value tables are not limited to the ones described above, and it is possible to perform a soft decision process using even more optimal parameters, through prior research and adequate settings.

Also, it is possible to compress data by using likelihood value tables that make the range of assignment 1.5 times, 2 times and so on as described above, without using a perfect normal distribution. By this means, it is possible to reduce the memory of the deinterleaving unit in later stage and improve performance without increasing the circuit scale.

By the way, as described above, cases might occur where making the inclination of demapping likelihood values moderate (that is, making the assignment range wider) produces a plurality of soft decision positions. To be more specific, when the assignment range of FIG. 8 is extended 2 times, soft decision parts for bits b0 are produced in 2 spots, namely PP0a and PP0b.

However, even when a plurality of soft decision spots are produced, with the present embodiment, the range of assignment is simply made 1.5 times, 2 times and so on (that is, the inclination is made ⅔ times, ½ times, and so on), it is possible to reconstruct data using soft decision information from one spot.

To be more specific, in FIG. 8, although soft decision spots for bit b0 are 2 places, namely PP0a and PP0b, if, for example, b0 is PP0a, at the position of "0.2," it is possible estimate that b2 (PP2) is "1" and b4 (PP4) is "0.3." In this way, by performing likelihood adjustment for enabling reconstruction based on soft decision information for one spot, it is possible to secure high performance characteristics at low cost.

Figure 17:
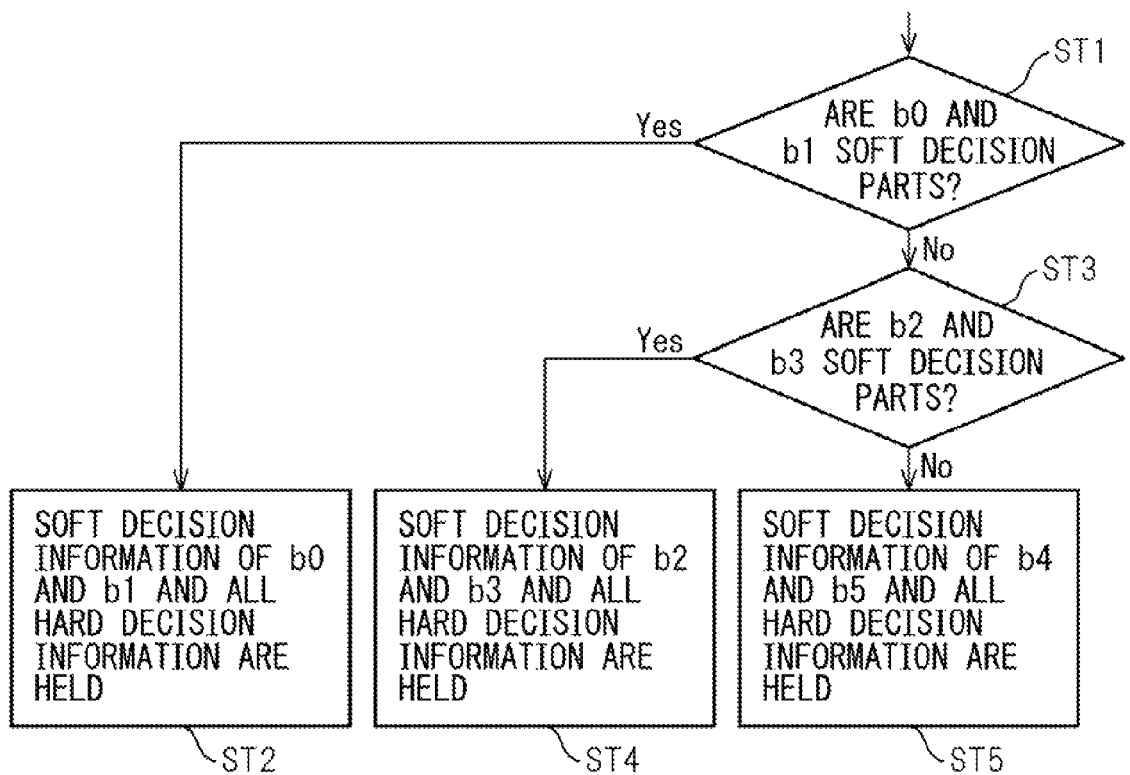
FIG. 17 is a flowchart for explaining an example of a process in a variation of a second embodiment explained with reference to FIG. 8, FIG. 9A, FIG. 9B and FIG. 9C.

FIG. 17 is a flowchart for explaining an example of process by a variation of the second embodiment explained with reference to FIG. 8, FIG. 9A, FIG. 9B and FIG. 9C.

First, in step ST1, whether or not bits b0 and b1 are soft decision spots is determined, and, when bits b0 and b1 are determined to be soft decision spots, the step moves on to step ST2, and the soft decision information of b0 and b1 and all hard decision information are held.

Also, in step ST1, when bits b0 and b1 are determined not to be soft decision spots, the step moves on to step ST3, and whether or not b2 and b3 are soft decision parts is decided. In step ST3, when bits b2 and b3 are decided to be soft decision spots, the step moves on to step ST4, and the soft decision information for b2 and b3 and all hard decision information are held.

On the other hand, when bits b2 and b3 are determined not to be soft decision spots in step ST3, the step moves on to step ST5, and the soft decision information for b4 and b5 and all hard decision information are held.

Then, when a plurality of soft decision spots are produced, information that is held is used, and a data decision process is performed using, for example, the tables of FIG. 16A, FIG. 16B, FIG. 16C and FIG. 16D described above. That is to say, in the demapping unit 107, soft decision is performed using soft decision information for one location among a plurality of soft decision spots, and, for example, to the deinterleaving unit 108 in a later stage, a demapping output is output in the same way as when there is one soft decision position.

Figure 18:
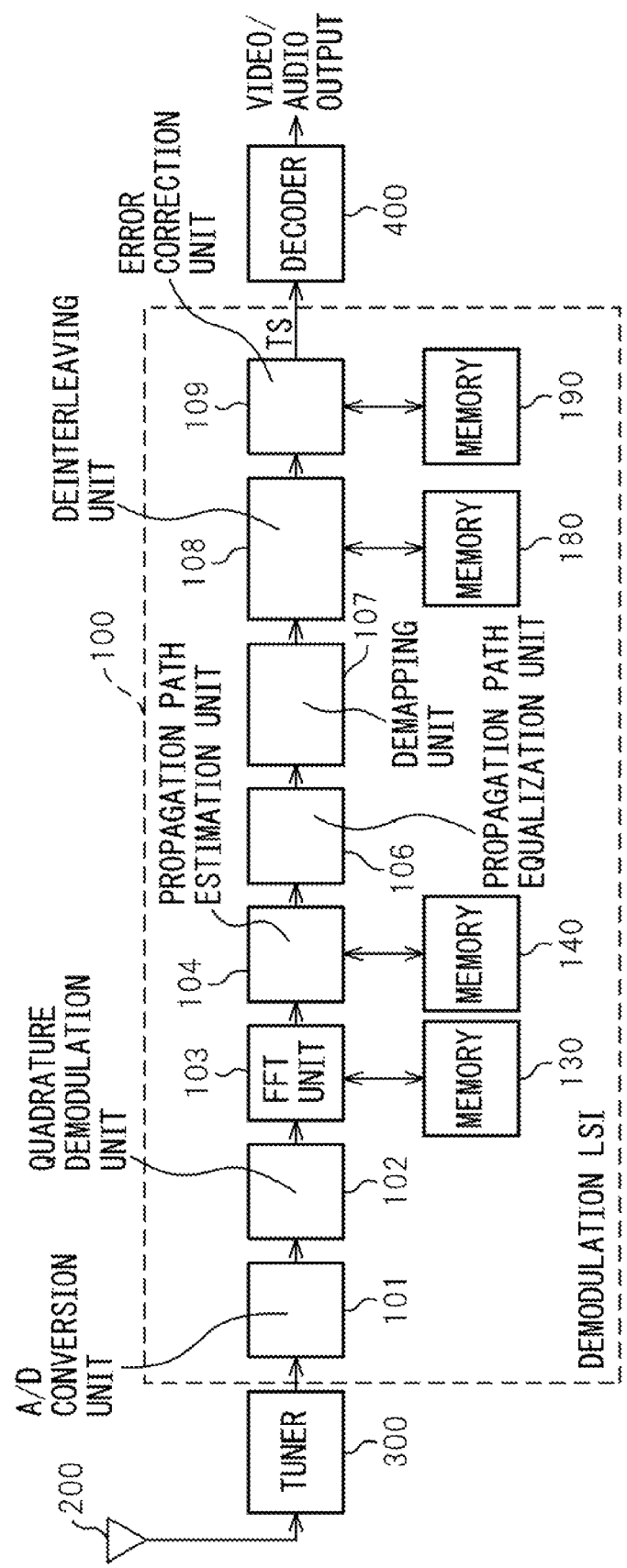
FIG. 18 is a block diagram illustrating an example of a receiving apparatus according to the present embodiment.

FIG. 18 is a block diagram illustrating an example of a receiving apparatus according to the present embodiment, and the receiving apparatus of the present embodiment has a demodulation circuit (demodulating LSI) 100, an antenna 200, a tuner 300 and a decoder 400 that comply with terrestrial digital broadcast.

Like FIG. 10 described earlier, the demodulation circuit 100 includes an A/D converter 101, a quadrature demodulating unit 102, an FFT unit 103, a propagation path estimation unit 104, a propagation path equalization unit 106, a demapping unit 107, a deinterleaving unit 108 and an error correction unit 109.

Here, in the FFT unit 103, propagation path estimation unit 104, deinterleaving unit 108 and error correction unit 109, memories 130, 140, 180 and 190 are provided, respectively. The description of each block is the same as has been explained with reference to FIG. 10, and will be skipped.

The TS signal that is output from the demodulation circuit 100 is input to the decoder 400 and converted into a video or audio signal. This video and audio signal is provided to the user through, for example, a mobile telephone, car navigation system, television set display or speakers.

Note that the application of the present embodiment is not limited to terrestrial digital broadcast, and is widely applicable to receiving apparatuses of various modulation methods that perform soft decision process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A demodulation circuit comprising:
   a hard decision processor configured to perform a hard decision process using a demodulated signal, the demodulated signal being a demodulated received signal;
   a soft decision processor configured to determine a range of assignment with respect to a transitioning part in the demodulated signal, calculate a likelihood value of a bit, and perform a soft decision process; and
   a likelihood value selector configured to select a demapping likelihood value of the bit which is used to calculate the likelihood value, from a plurality of patterns that are prepared in advance, wherein
   the likelihood value selector selects the pattern based on a modulation method and coding rate of a received signal,
   the soft decision processor determines the range of assignment according to the pattern selected by the likelihood value selector, and performs the soft decision process, and
   the plurality of patterns prepared in advance comprise a pattern that makes the range of assignment larger when the modulation method includes a greater multi-value, and makes the range of assignment larger when the coding rate is lower.

2. The demodulation circuit as claimed claim 1, wherein the likelihood value selector selects the pattern based on receiving environment, and the soft decision processor determines the range of assignment according to the pattern selected by the likelihood value selector, and performs the soft decision process.

3. The demodulation circuit as claimed in claim 2, wherein the receiving environment includes conditions of a modulation error rate, delay information and fading level.

4. The demodulation circuit as claimed in claim 3, wherein the plurality of patterns prepared in advance include a pattern that makes the range of assignment larger when the modulation error rate is higher, and makes the range of assignment larger when the delay information and fading level are lower.

5. A demodulation method comprising:

performing a hard decision process using a demodulated signal, the demodulated signal being a demodulated received signal;

determining a range of assignment with respect to a transitioning part in the demodulated signal, calculating a likelihood value of a bit, and performing a soft decision process; and selecting a demapping likelihood value of the bit which is used to calculate the likelihood value, from a plurality of patterns that are prepared in advance, wherein
in the selection of the likelihood value, the pattern is selected based on a modulation method and coding rate of a received signal,
in the soft decision process, the range of assignment is determined according to the selected pattern, and the soft decision process is performed, and
the plurality of patterns prepared in advance comprise a pattern that makes the range of assignment larger when the modulation method includes a greater multi-value, and makes the range of assignment larger when the coding rate is lower.

6. The demodulation method as claimed in claim 5, wherein
in the selection of the likelihood value, the pattern is selected based on receiving environment, and
in the soft decision process, the range of assignment is determined according to the selected pattern, and the soft decision process is performed.

7. The demodulation method as claimed in claim 6, wherein
the receiving environment includes conditions of a modulation error rate, delay information and fading level.

8. The demodulation method as claimed in claim 7, wherein
the plurality of patterns prepared in advance include a pattern that makes the range of assignment larger when the modulation error rate is higher and, makes the range of assignment larger when the delay information and fading level are lower.

9. A receiving apparatus comprising:

a tuner configured to select a channel to receive;

a demodulation circuit configured to receive a received signal from the tuner; and a decoder configured to convert an output signal of the demodulation circuit and output a video/audio signal, wherein the demodulation circuit comprises:
a hard decision processor configured to perform a hard decision process using a demodulated signal, the demodulated signal being a demodulated received signal;
a soft decision processor configured to determine a range of assignment with respect to a transitioning part in the demodulated signal, calculate a likelihood value of a bit, and perform a soft decision process; and
a likelihood value selector configured to select a demapping likelihood value of the bit which is used to calculate the likelihood value, from a plurality of patterns that are prepared in advance, wherein
the likelihood value selector selects the pattern based on a modulation method and coding rate of a received signal,
the soft decision processor determines the range of assignment according to the pattern selected by the likelihood value selector, and performs the soft decision process, and
the plurality of patterns prepared in advance comprise a pattern that makes the range of assignment larger when the modulation method includes a greater multi-value, and makes the range of assignment larger when the coding rate is lower.

* * * * *